United States Patent
Zhang (10) Patent No.: US 8,453,319 B2
(45) Date of Patent: Jun. 4, 2013

(54) PROCESS FOR FORMING A HEXAGONAL ARRAY

(75) Inventor: Guigen Zhang, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 284 days.

(21) Appl. No.: 12/825,897

(22) Filed: Jun. 29, 2010

(65) Prior Publication Data
US 2010/0326710 A1    Dec. 30, 2010

Related U.S. Application Data

(60) Provisional application No. 61/221,245, filed on Jun. 29, 2009.

(51) Int. Cl.
*H01R 43/00*    (2006.01)

(52) U.S. Cl.
USPC .............................................. 29/825; 29/846

(58) Field of Classification Search
USPC .................................................... 29/825, 846
See application file for complete search history.

(56) References Cited

U.S. PATENT DOCUMENTS

| | | | | |
|---|---|---|---|---|
| 7,189,635 | B2 * | 3/2007 | Sharma | 438/584 |
| 2007/0049028 | A1 * | 3/2007 | Subramanian et al. | 438/689 |
| 2008/0061214 | A1 * | 3/2008 | Lee et al. | 249/112 |
| 2009/0243584 | A1 | 10/2009 | Zhang et al. | |
| 2009/0297913 | A1 | 12/2009 | Zhang et al. | |
| 2010/0066346 | A1 | 3/2010 | Zhang et al. | |

OTHER PUBLICATIONS

Gold Seeds Arangement on a Nanoporous Anodic Aluminum Oxide Membrane by Centrifugal Force, in 2004 International Microprocesses and Nanotecnology Conference (IEEE)a paper by C. Fengmin et al pp. 212-213 (Oct. 2004).*
Anandan et al. "Role of reaction kinetics and mass transport in glucose sensing with nanopillar array electrodes", *Journal of Biological Engineering*:1-10 (Oct. 10, 2007).
Anandan et al. "Nanopillar array structures for enhancing biosensing performance", *Int. J. Nanomedicine* 1(1):73-79 (2006).
Branton et al. "The potential and challenges of nanopore sequencing", *Nature Biotechnology* 26(10):1146-1153 (2008).
Coombs "The sequencing shakeup", *Nature Biotechnology* 26(10):1109-1112 (2008).
Grahame "The Electrical Double Layer and the Theory of Electrocapillarity", *Chem. Rev.* 41:441-501 (1947).
He et al. "Identification of DNA Basepairing via Tunnel-Current Decay", *Nano Letters* 7(12):3854-3858 (2007).

(Continued)

*Primary Examiner* — Carl Arbes
(74) *Attorney, Agent, or Firm* — Myers Bigel Sibley & Sajovec, P.A.

(57) ABSTRACT

The present invention relates to nanopillar arrays that may have relatively large dimensions and relatively large interpillar distances. The present invention also relates to methods of forming the same. In some embodiments of the invention, methods of forming hexagonal nanopillar arrays include forming a base comprising aluminum; forming a hexagonal pattern of pits in the aluminum; anodizing the aluminum to form aluminum oxide comprising a primary hexagonal nanopore array at the positions of the pits in the aluminum; depositing a conductive material into the nanopores of the primary hexagonal nanopore array; and removing the mask and the aluminum oxide to provide the hexagonal nanopillar array.

24 Claims, 10 Drawing Sheets

OTHER PUBLICATIONS

Spacially Sel;ective Metal Deposition into a Hole Array Strucure of Anodic Porous Alumina Using a Microelectrode an article by H Masuda et al Jpn J. Appl. Phys. vol. 37 (1998) 1090-1092.*

Heng et al. "Beyond the Gene Chip", *Bell Labs Tech. Journal* 10(3):5-22 (2005).

Ho et al. "Electrolytic transport through a synthetic nanometer-diameter pore", *PNAS* 102(30):10445-10450 (2005).

Kolb "Electrochemical Surface Science", *Angew. Chem. Int. Ed.* 40:1162-1181 (2001).

Lagerqvist et al. "Influence of the Environment and Probes on Rapid DNA Sequencing via Transverse Electronic Transport", *Biophysical Journal* 93:2384-2390 (2007).

Lee et al. "Hot Spots in Silver Nanowire Bundles for Surface-Enhanced Raman Spectroscopy", *J. Am. Chem. Soc.* 128:2200-2201 (2006).

Lin et al. "Nanopillar Subtrate for SERS", 7$^{th}$ International Conference on Miniaturized Chemical and Biochemical Analysis Systems 705-708 (Oct. 5-9, 2003).

Parry et al. "In Situ Fourier Transform Infrared Spectroelectrochemical Study of Bisulfate and Sulfate Adsorption on Gold, with and without the Underpotential Deposition of Copper", *Langmuir* 9:1878-1887 (1993).

Singhal et al. "Ultrasensitive Voltammetric Detection of Underivatized Oligonucleotides and DNA", *Anal. Chem.* 69:4828-4832 (1997).

Yang et al. "Simulating the structure and effect of the electrical double layer at nanometer electrodes", *Nanotechnology* 18:1-9 (2007).

Yang et al. "The effect of an electrical double layer on the voltammetric performance of nanoscale interdigitated electrodes: a simulation study", *Nanotechnology* 19:1-8 (2008).

Masuda et al. "Ordered Metal Nanohole Arrays Made by a Two-Step Replication of Honeycomb Structures of Anodic Alumina", *Science* 268:1466-1468 (1995).

Masuda et al. "Self-repair of ordered pattern of nanometer dimensions based on self-compensation properties of anodic porous alumina", *Applied Physics Letters* 78(6):826-828 (2001).

Moustafa et al. "Electrodeposition of Al in 1-Butyl-1-methylpyrrolidinium Bis(trifluoromethylsulfonyl)amide and 1-Ethyl-3-methylimidazolium Bis(trifluoromethylsulfonyl)amide Ionic Liquids: In Situ STM and EQCM Studies", *J. Phys. Chem. B*. 111:4693-4704 (2007).

Rao et al. "Fast Fourier Transform Analysis of Pore Pattern in Anodized Alumina Formed at Various Conditions", *J. Nanosci. Nanotechnol.* 5(12):2070-2075 (2005).

* cited by examiner

PROCESS FOR FORMING A HEXAGONAL ARRAY

CROSS-REFERENCE TO RELATED APPLICATIONS

This application claims priority from U.S. Provisional Application Ser. No. 61/221,245, filed Jun. 29, 2009, the disclosure of which is hereby incorporated by reference herein in its entirety.

FIELD OF THE INVENTION

The present invention relates to nanopillar arrays and methods of forming the same.

BACKGROUND OF THE INVENTION

An aluminum sheet undergoing electrochemical anodization may form aluminum oxide having a hexagonal array of vertical nanopores defined therein. For this process, the relationship between the anodization potential, the pore diameter and the interpore distance has been investigated. See, Rao, Y. L. et al., *J. Nanosci. Nanotech.,* 2, 12, 2070-2075 (2005). It has been determined that the pore diameter (PD) may be related to the anodization potential (AP) by Formula I:

$$PD = 1.35 \text{ (nm/}V\text{)} * AP(V) \tag{I}$$

It has also been determined that the pore spacing (PS, or interpore distance) may be related to the anodization potential by Formula II:

$$PS = 2.58 \text{ (nm/}V\text{)} * AP(V) \tag{II}$$

Thus, in theory, in a spontaneous pore-forming process, the pore diameter and interpore distance of the nanopores can be set by adjusting the anodization potential according to these formulas. However, a spontaneous pore-forming process may not lead to a pore distribution pattern that is perfectly hexagonal due to inherent atomic defects in the aluminum. Therefore, if a conductive material is deposited into such nanopores and the aluminum oxide is removed, the resulting nanopillars may also not be in a mono-domain hexagonal array. As such, new methods of forming hexagonal arrays of nanopores and new methods of forming conductive nanopillars therefrom, particularly conductive nanopillars having large interpillar distances, may be needed.

SUMMARY OF THE INVENTION

Provided according to some embodiments of invention are mono-domain hexagonal nanopillar arrays that have an interpillar distance in a range of about 20 nm to about 100 µm, wherein each of the nanopillars has a width in a range of about 10 nm to about 600 nm. In addition, in some embodiments, each of the nanopillars has a height in a range of about 1 nm to about 1 mm. In some embodiments of the invention, each of the nanopillars is conductive, and in some embodiments, the nanopillars include a metal, such as aluminum, gold, silver, copper, titanium and/or tantalum. In some embodiments, the hexagonal nanopillar arrays further include a conductive substrate, and each of the nanopillars is on and electrically coupled to the conductive substrate. Furthermore, provided according to some embodiments of the invention are hexagonal nanopillar arrays formed by methods described herein.

Provided according to some embodiments of the invention are methods of forming a hexagonal nanopillar array that include forming a base comprising aluminum; forming a hexagonal pattern of pits in the aluminum; anodizing the aluminum to form aluminum oxide that includes a primary hexagonal array of nanopores at positions of the pits in the aluminum; depositing a conductive material into the nanopores of the primary hexagonal array of nanopores; and removing the aluminum oxide to provide a hexagonal nanopillar array.

The base comprising aluminum may be formed in many different configurations. However, in some embodiments of the invention, forming a base comprising aluminum includes forming a layer of titanium on a substrate; forming a layer of gold on the titanium layer; and forming a layer of aluminum on the gold layer. In some embodiments, the titanium layer has a thickness in a range of about 1 nm to about 100 nm. In some embodiments, the gold layer has a thickness in a range of about 1 nm to about 100 nm. In some embodiments, the aluminum layer has a thickness in a range of about 1 nm to about 1 mm.

In some embodiments of the invention, forming a hexagonal pattern of pits in the aluminum may be achieved by pressing a stamp into the aluminum. The stamp may include a hexagonal pattern of projections, and the hexagonal pattern of projections may form the hexagonal pattern of pits when pressed into the aluminum. In some embodiments, the projections may include silicon nitride.

In some embodiments of the invention, forming the hexagonal pattern of pits in the aluminum includes applying a photoresist to a surface of the aluminum; creating a photoresist pattern defining exposed regions of the surface of the aluminum at positions of the hexagonal pattern of pits; and treating the exposed regions of the surface of the aluminum through the photoresist pattern to create the hexagonal array of pits in the aluminum; and removing the photoresist. In some embodiments, the treating is achieved by electro stripping of the aluminum.

In some embodiments of the invention, the hexagonal pattern of pits in the aluminum has a lattice constant in a range of about 300 nm to about 100 µm. In some embodiments, each of the pits in the aluminum has a width in a range of about 10 nm to about 600 nm. In some embodiments of the invention, the methods further include electropolishing the aluminum after forming the hexagonal pattern of pits and before anodizing the aluminum.

In some embodiments of the invention, when the aluminum is anodized, a mono-domain primary hexagonal nanopore array is formed in the aluminum oxide. In some embodiments, the width of each of the nanopores of the primary hexagonal nanopore array is in a range of about 10 nm to about 400 nm. In some embodiments, the lattice constant of the primary hexagonal nanopore array is in a range of about 300 nm to about 100 µm. In addition to the primary hexagonal nanopore array, in some embodiments, the aluminum oxide formed by anodization further includes a secondary hexagonal nanopore array more closely spaced than the primary nanopore array. The nanopores of the primary hexagonal nanopore array may also be part of the secondary hexagonal nanopore array.

In some embodiments, methods further include resizing widths of the nanopores of the primary hexagonal nanopore array after anodization. In some embodiments, the width of each of the nanopores of the primary hexagonal nanopore array after resizing is in a range of about 10 nm to about 600 nm.

In some embodiments of the invention, the methods further include masking the nanopores of the secondary hexagonal array that are not part of the primary hexagonal nanopore array, such that the nanopores of the primary hexagonal nanopore array are exposed.

In some embodiments of the invention, the conductive material that is deposited into the nanopores of the primary hexagonal nanopore array includes a metal. In some embodiments, the metal includes at least one of aluminum, gold, silver, copper, titanium and tantalum. Further, in some embodiments, the depositing of the metal may be achieved by electrodepositing.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Embodiments of the invention are described herein with reference to cross-section illustrations that are schematic illustrations of idealized embodiments (and intermediate structures) of the invention. The dimensions of layers and regions in the drawings may be exaggerated for clarity. Additionally, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Figure 1A:
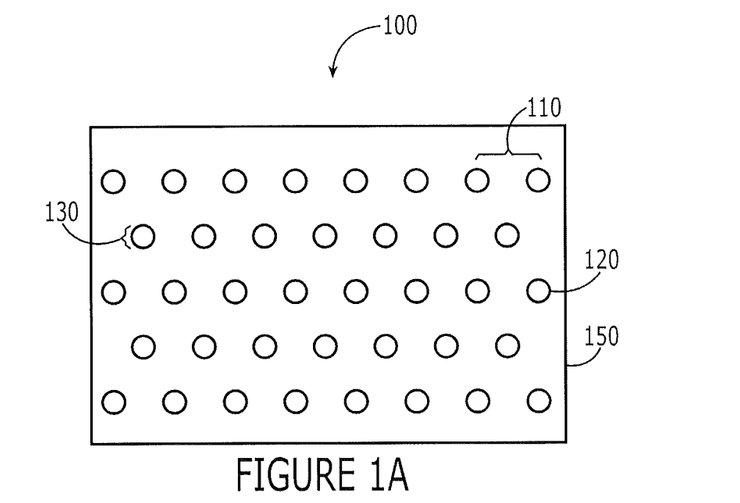
FIG. 1A is a plan-view schematic of a mono-domain hexagonal nanopillar array according to some embodiments of the invention.
Figure 1B:
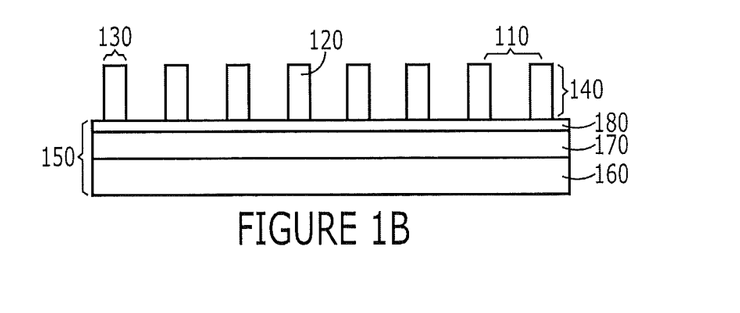
FIG. 1B is a side-view of the schematic in FIG. 1A.

Provided according to some embodiments of invention are mono-domain hexagonal nanopillar arrays. FIGS. 1A and 1B illustrate a schematic plan-view and side-view, respectively, of a mono-domain hexagonal nanopillar array. In some embodiments of the invention, the mono-domain hexagonal nanopillar array 100 has an interpillar distance 110 in a range of about 20 nm to about 100 μm. As used herein, the interpillar distance is measured from the center of a nanopillar to the center of an adjacent nanopillar, and the interpillar distance may also be referred to as the lattice constant. Furthermore, in some embodiments, each nanopillar 120 has a width 130 in a range of about 10 nm to about 600 nm. For a cylindrical nanopillar, the width of the nanopillar may be its diameter. In some embodiments, each nanopillar 120 may have a height 140 in a range of about 1 nm to about 1 mm.

According to some embodiments of the invention, each nanopillar 120 in the mono-domain hexagonal nanopillar array 100 is conductive, and in some embodiments, each nanopillar 120 includes a metal, such as aluminum, gold, silver, copper, titanium and/or tantalum. Additionally, in some embodiments, the mono-domain hexagonal nanopillar array further includes a conductive substrate 150, and each nanopillar 120 is on and electrically coupled to the conductive substrate 150. In some embodiments, the conductive substrate 150 may include a base substrate 160, such as glass or silicon; a titanium layer 170 on the base substrate 160; and a gold layer 180 on the titanium layer 170.

As used herein, when a hexagonal array of nanopillars is referred to as being "mono-domain," it is meant that the nanopillars of the array have a constant interpillar distance, or lattice constant. A hexagonal array is considered mono-domain if the quantitative tolerance of the interpillar distance is within 10%. However, in some embodiments, the quantitative tolerance may be within 5%.

Further provided according some embodiments of the invention are hexagonal nanopillar arrays formed by a method described herein.

Provided according to some embodiments of the invention are methods of forming a hexagonal nanopillar array that include forming a base comprising aluminum; forming a hexagonal pattern of pits in the aluminum; anodizing the aluminum to form aluminum oxide comprising a primary hexagonal nanopore array at positions of the pits in the aluminum; depositing a conductive material into the nanopores of the primary hexagonal nanopore array; and removing the aluminum oxide to provide the hexagonal nanopillar array.

Figure 2:
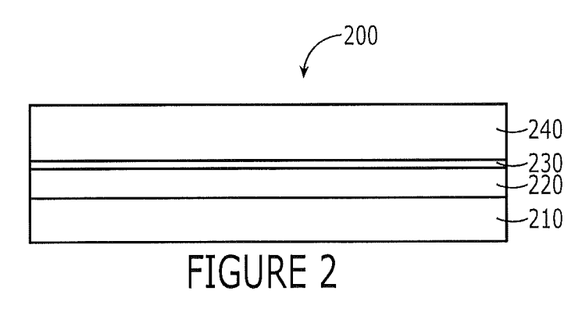
FIG. 2 is a side-view schematic of a base that includes aluminum, according to some embodiments of the invention.

Referring to FIG. 2, the base comprising aluminum 200 may be formed in many different configurations. However, in some embodiments of the invention, forming a base comprising aluminum 200 includes forming a layer of titanium 220 on a substrate 210; forming a layer of gold 230 on the titanium layer 220; and forming a layer of aluminum 240 on the gold layer 230. Any suitable substrate may be used, but in some embodiments, a glass or silicon substrate is used. The titanium layer 220, the gold layer 230 and the aluminum layer 240 may be deposited by any suitable method, but in some embodiments, the metal layers are deposited using an E-beam evaporator. In some embodiments, the titanium layer 220 has a thickness in a range of about 1 nm to about 100 nm. In some embodiments, the gold layer 230 has a thickness in a range of about 1 nm to about 100 nm. In some embodiments, the aluminum layer 240 has a thickness in a range of about 1 nm to about 1 mm.

Figure 3A:
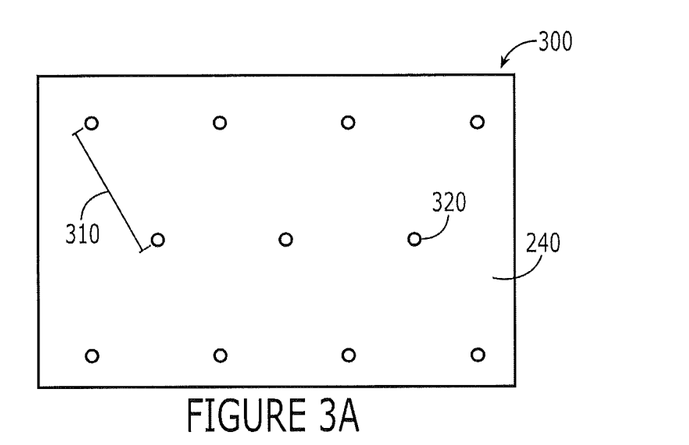
FIG. 3A is a plan-view schematic of an aluminum base that includes a hexagonal pattern of pits according to some embodiments of the invention.
Figure 3B:
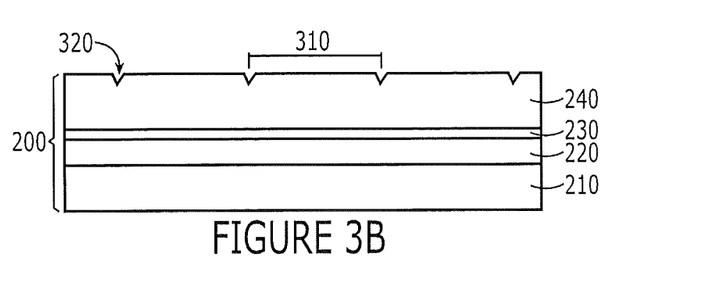
FIG. 3B is a side-view of the schematic in FIG. 3A.

Referring to FIGS. 3A and 3B, a mono-domain nanopore distribution may be achieved by forming a hexagonal pattern of pits 300 in the aluminum layer 240 of the base comprising aluminum 200. In some embodiments, the hexagonal pattern of pits 300 has a lattice constant 310 in a range of about 300 nm to about 100 μm. The lattice constant is measured from the center of each of the pits. In some embodiments, each pit 320 in the aluminum 240 has a width in a range of about 10 nm to about 600 nm. The forming of a hexagonal pattern of pits 300 in the aluminum layer 240 may be achieved by any suitable method.

Figure 4A:
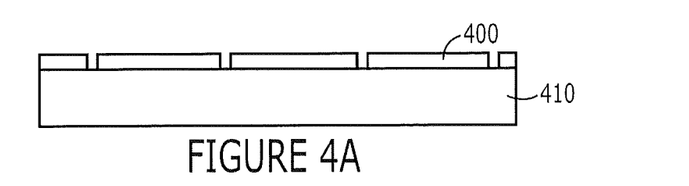
FIGS. 4A-4E illustrate the formation of an imprint stamp according to some embodiments of the invention. The imprint stamp is shown in the side-view.
Figure 4B:
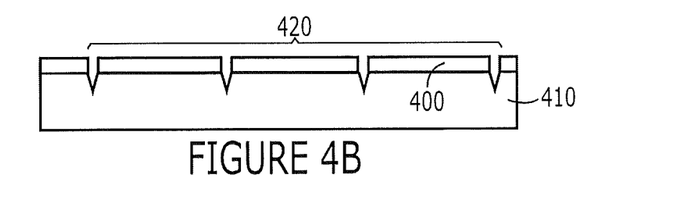
Figure 4C:
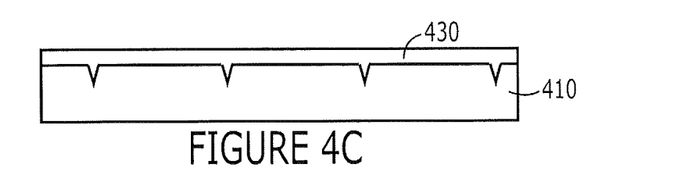
Figure 4D:
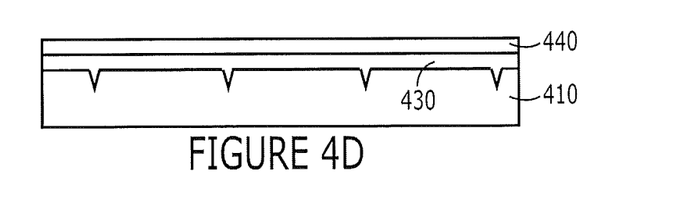
Figure 4E:
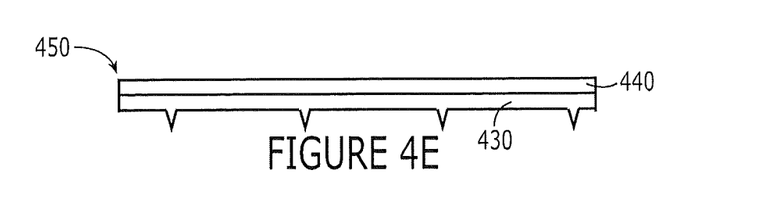

In some embodiments, forming a hexagonal pattern of pits 300 in the aluminum layer 240 may be achieved by pressing a stamp into the aluminum layer 240. For example, the stamp may include a hexagonal pattern of projections having a predefined lattice constant 310, and the pressing of the stamp into the aluminum layer 240 may create the hexagonal pattern of pits 300 having the predefined lattice constant 310. In some embodiments, the projections may be in a pyramidal or conical shape. The projections may be made of any suitable material but in some embodiments, the projections may include silicon nitride. Referring to FIG. 4, in some embodiments, the hexagonal pattern of projections may be formed by forming a photoresist 400 on a mold substrate 410, e.g., a silicon wafer, and patterning the photoresist 400 using a lithographic method (e.g., UV lithography) (FIG. 4A); anisotropic etching of the mold substrate 410 to create a mold substrate 410 having a hexagonal array of inverted pyramids 420 (FIG. 4B); removing the photoresist 400; depositing a stamp material 430, e.g., silicon nitride, into the mold substrate 410 using a technique such as chemical vapor deposition (CVD) (FIG. 4C); optionally bonding a support structure 440 to the top of the stamp material 430 (FIG. 4D); and releasing the imprint stamp 450 from the mold substrate 410 (FIG. 4E).

Referring back to FIG. 3, in some embodiments of the invention, forming the hexagonal pattern of pits 300 in the aluminum 240 includes applying a photoresist to a surface of the aluminum 240; creating a photoresist pattern defining exposed regions of the surface of the aluminum 240 at positions of the hexagonal pattern of pits; and treating the exposed regions of the surface of the aluminum 240 through the photoresist pattern to create the hexagonal pattern of pits 300 in the aluminum 240; and removing the photoresist. Any suitable photoresist material may be used. For example, in some embodiments, the photoresist material is a Shipley 1818 positive photoresist and is developed using an Microposit® MF 319 developer. In some embodiments, the treating of the exposed regions of the surface of the aluminum 240 may be achieved by electrochemical stripping of the aluminum 240. Electrochemical stripping may, for example, be performed in an ethanol/water solution. Once the exposed regions of the surface of the aluminum 240 are treated, the photoresist may be removed. Thus, a hexagonal pattern of pits 300 may be formed in the surface of the aluminum 240. In some embodiments of the invention, the aluminum 240 is electropolished after forming the hexagonal pattern of pits. In some embodiments, electropolishing is performed in an ethanol/water solution. The electropolished aluminum surface may then be electrochemically anodized.

Figure 5A:
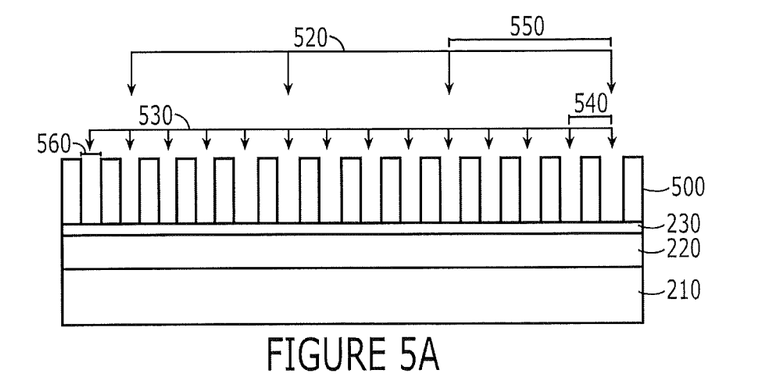
FIG. 5A is a side-view schematic of the aluminum base in FIG. 3B after electrochemical anodization in which the aluminum is oxidized to aluminum oxide having a primary hexagonal nanopore array and a secondary hexagonal nanopore array defined therein.

When the aluminum 240 is electrochemically anodized, the aluminum 240 may be oxidized to form aluminum oxide, which may also be referred to as alumina. Referring to FIG. 5A, upon anodization, a primary hexagonal nanopore array 520 may be formed within the aluminum oxide 500, such that a primary hexagonal nanopore array 520 forms at the location of the hexagonal pattern of pits. In addition to the primary hexagonal nanopore array 520 located at the position of the hexagonal pattern of pits, a secondary hexagonal nanopore array 530 having a lattice constant 540 that is less than the lattice constant 550 of the primary hexagonal nanopore array 520 may also form. The secondary hexagonal nanopore array 530 may thus include the primary hexagonal nanopore array 520.

Figure 5B:
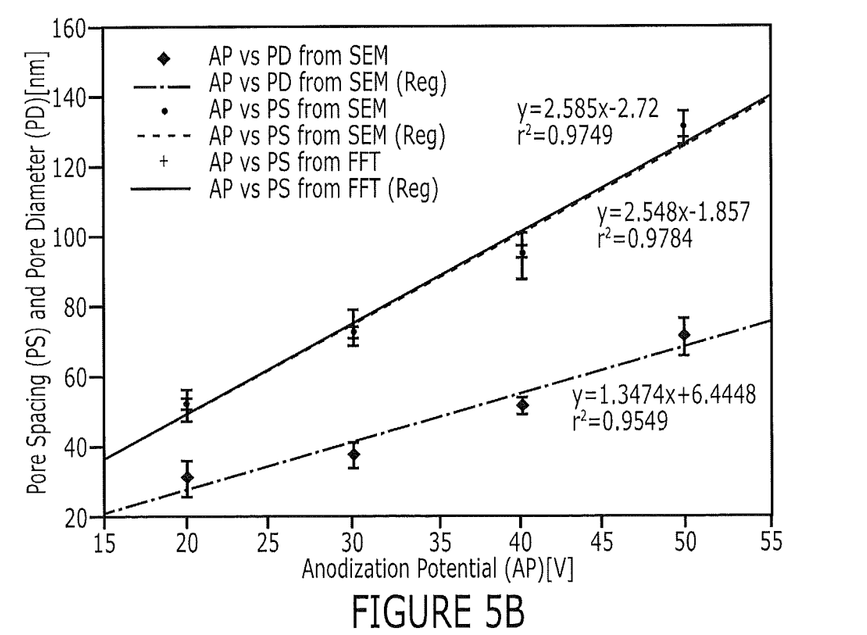
FIG. 5B is a graph depicting the pores spacing (nm) and pore diameter (nm) in the aluminum oxide as a function of anodization potential (V).

Techniques and conditions for anodization can be found in Rao, Y. L., Anandan V. and Zhang, G., *J. Nanosci. Nanotech.*, 2, 12, 2070-2075 (2005), the contents of which are incorporated herein by reference in their entirety. In some embodiments, the pore width or diameter (PD) 560 and the pore spacing (PS, or interpore distance, which is the same distance as the lattice constant 540) of the nanopores of the secondary hexagonal array 530 may be preselected by the choice of anodization potential (AP) used, per the relationships identified by Formulae I and II and depicted in FIG. 5B:

$$PD=1.35 \text{ (nm}/V)*AP(V) \quad (I)$$

$$PS=2.58 \text{ (nm}/V)*AP(V) \quad (II).$$

The imprinting of the hexagonal pattern of pits 300 (see FIG. 3A) in the aluminum 240 may cause the formation of nanopores of the primary hexagonal nanopore array 520 at the position of the hexagonal pattern of pits. As shown in FIG. 5A, in some embodiments of the invention, the lattice constant of the primary hexagonal nanopore array 520 may be a multiple (e.g., 2, 3, 4 or 5 times) of the lattice constant of the secondary hexagonal nanopore array 530, and thus, the nanopores of the primary hexagonal nanopore array 520 may also be part of the secondary hexagonal nanopore array 530. In some embodiments, the primary hexagonal nanopore array 520 is a mono-domain array, and in some embodiments, the secondary hexagonal nanopore array 530 is a mono-domain array. However, in some embodiments, the primary hexagonal nanopore array 520 is a mono-domain array while the secondary hexagonal nanopore array 530 is not a mono-domain array.

In some embodiments of the invention, a width 560 (the width is the pore diameter for a cylindrical nanopore) of each of the nanopores of the primary hexagonal nanopore array 520 is in a range of about 10 nm to about 400 nm. In some embodiments, the lattice constant 550 of the primary hexagonal nanopore array 520 is in a range of about 300 nm to about 100 µm. In some embodiments, the lattice constant 540 for the secondary hexagonal nanopore array 530 is in a range of about 10 nm to about 600 nm.

Figure 6A:
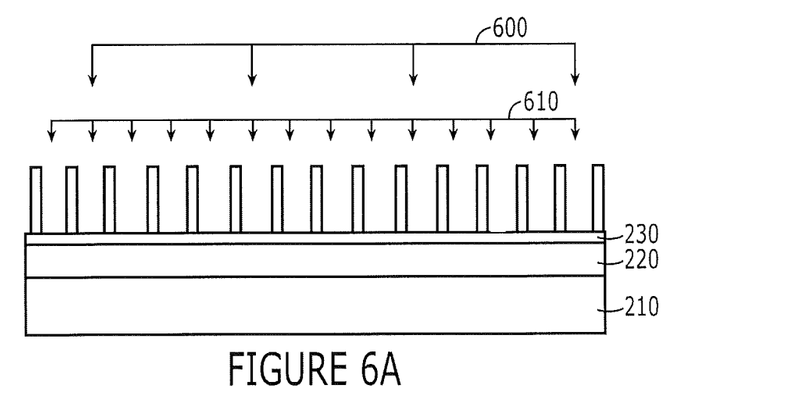
FIG. 6A is a side-view of the schematic in FIG. 5A after resizing of the nanopores.

In some embodiments of the invention, the methods further include resizing widths 560 of the nanopores of the primary hexagonal nanopore array 520 and the secondary hexagonal nanopore array 530 after anodization. Referring to FIG. 6A, resizing the widths of the nanopores may result in a resized primary hexagonal nanopore array 600 and a resized secondary hexagonal nanopore array 610. The widths of the nanopores may be resized by any suitable process, but in some embodiments, the resizing of the widths of the nanopores is achieved by applying an acid, such as phosphoric acid, to the nanopores. In some embodiments, the width of each of the nanopores of the resized primary hexagonal nanopore array 600 is in a range of about 10 nm to about 600 nm. In some embodiments, the width of each of the nanopores of the resized secondary hexagonal nanopore array 610 is in a range of about 10 nm to about 600 nm.

Figure 6B:
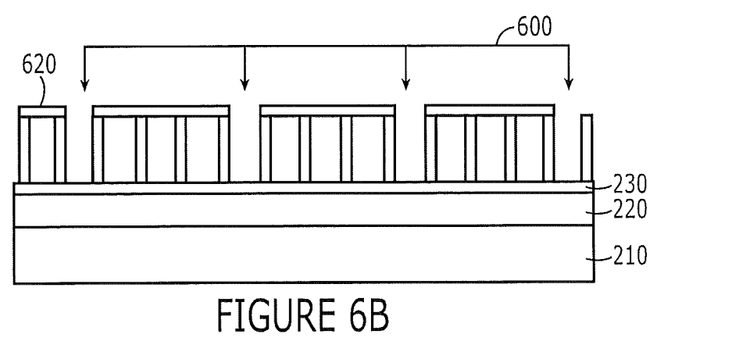
FIG. 6B is a side-view of the schematic in FIG. 6A after masking.

Referring to FIG. 6B, in some embodiments of the invention, a portion of the resized secondary nanopore array 610 is covered with a mask 620 such that only the nanopores of the resized primary hexagonal nanopore array 600 are exposed. Forming of the mask 620 may be achieved by any suitable manner, but in some embodiments, the mask 620 is applied via a lithographic method. For example, a photoresist (e.g., Shipley 1818 positive photoresist) may be deposited, selectively irradiated and developed to produce a mask 620 that selectively covers the nanopores of the resized secondary hexagonal nanopore array 610 that are not part of the resized primary hexagonal nanopore array 600. Alternatively, a stamp, e.g., a soft polydimethylsiloxane (PDMS) stamp, may be used to stamp a polymeric mask 620 onto the portion of the resized secondary hexagonal nanopore array 610 that is not part of the resized primary hexagonal nanopore array 600. While this masking step has been described herein with reference to the resized secondary hexagonal nanopore array 610 and the resized primary hexagonal nanopore array 600, the same steps can be used for hexagonal nanopore arrays that have not been resized (e.g., see FIG. 5A). The methods described below can also be performed on hexagonal nanopore arrays that have not been resized.

Figure 7A:
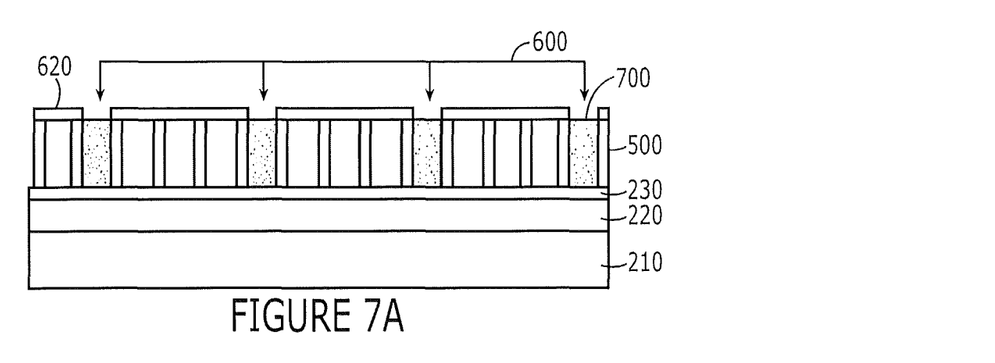
FIG. 7A is a side-view of the schematic of FIG. 6B after a conductive material has been deposited into the resized primary hexagonal nanopore array.

Referring to FIG. 7A, methods according to embodiments of the invention further include depositing a conductive material 700 into the exposed nanopores of the resized primary hexagonal nanopore array 600. In some embodiments, the conductive material 700 that is deposited into the nanopores of the resized primary hexagonal nanopore array 600 includes a metal. In some embodiments, the metal includes at least one of aluminum, gold, silver, copper, titanium and tantalum. The depositing of the metal may be achieved by any suitable method, but in some embodiments, the depositing of the metal is achieved via electrodeposition. Electrodeposition may proceed by any suitable method and may depend on the material deposited. In some embodiments, electrodeposition of aluminum nanopillars may be achieved using an electrolyte solution containing 1-ethyl-3-methyl-imidazolium bis(trifluoromethylsulfonyl)amide or 1-butyl-1-methyl-pyrrolidinium bis(trifluoromethylsulfonyl)amide. Further details regarding electrodeposition methods that may be used according to some embodiments of the invention may be found in Moustafa, E. M. et al., *J. Phys. Chem. B*, 111, 4693-4704 (2007), the contents of which are incorporated herein by reference in their entirety. In some embodiments, electrodeposition of gold nanopillars may be achieved using an electrolyte solution containing OROTEMP 24 gold plating solution (Tehnic Inc, Cranston, R.I., USA).

Figure 7B:
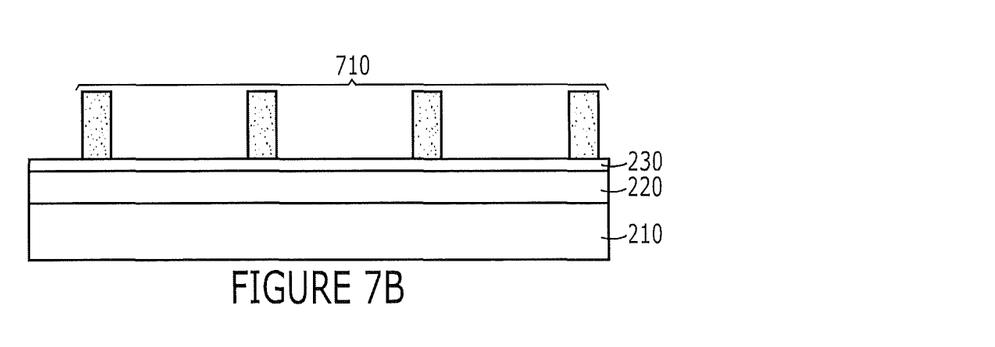
FIG. 7B is a side-view of the schematic in FIG. 7A after the aluminum oxide and masking have been removed.

Once a conductive material 700 is deposited into the nanopores of the resized primary hexagonal nanopore array 600, the aluminum oxide 500 and the mask 620 may be removed. As shown in FIG. 7B, this may produce a mono-domain hexagonal nanopillar array of the conductive material 710 at the position of the resized primary hexagonal array of nanopores 600. Any suitable method for removing the mask 620 and the aluminum oxide 500 may be used. However, in some embodiments, the aluminum oxide 500 is dissolved by placing the aluminum oxide encased metallic nanopillars in a basic solution (e.g., 2.0 M sodium hydroxide) for a suitable time.

The methods described herein may provide nanopillar arrays that are mono-domain and which may also have relatively large interpillar distances. These nanopillar arrays may be used in a variety of applications. For example, the conductive nanopillar arrays may be used as anodes or cathodes in electrochemical energy storage devices or electron conversion devices, as charged surfaces in ultra-capacitors, and as electrodes in electrochemical based sensors and biosensors.

The present invention will now be described in more detail with reference to the following example. However, this example is given for the purpose of illustration and is not to be construed as limiting the scope of the invention.

EXAMPLE

Example 1

Figure 8A:
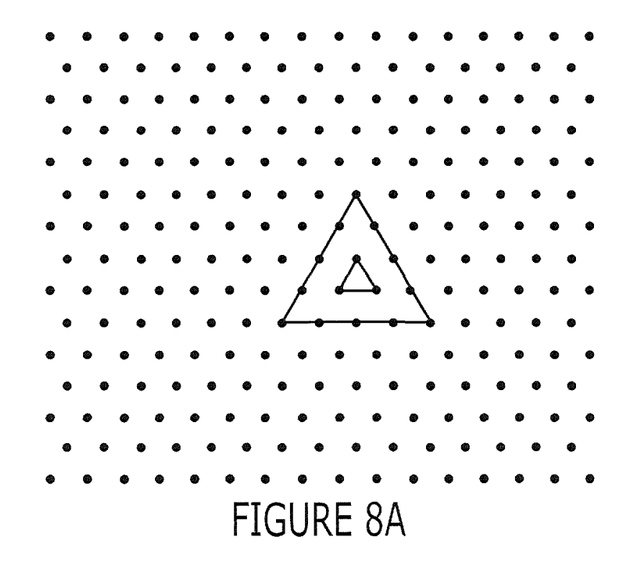
FIG. 8A is a hexagonal lattice pattern having a smaller lattice constant defined by the sides of the small equilateral triangle and a larger lattice constant defined by the sides of the larger equilateral triangle.

For the process described below, the actual dimensions of the pore diameter and interpore distance can be adjusted. However, in this example, a pore diameter of 250 nm and an interpore distance of 1.2 µm may be provided. As illustrated in FIG. 8A, starting with a hexagonal pattern with a lattice constant of 300 nm (defined by the sides of the small equilateral triangle), a new hexagonal pattern defined by the vertices of the large equilateral triangle with a lattice constant of 1.2 µm may be identified. With this new pattern (shown in FIG. 8B), an imprint stamp or a photo mask will be made.

Step 1: Sample preparation (See FIG. 2): A silicon wafer or a glass slide is cleaned and coated with a layer of titanium (10 nm) followed by a layer of gold (5-10 nm) and a layer of aluminum (1 µm) using an E-beam evaporator.

Figure 8B:
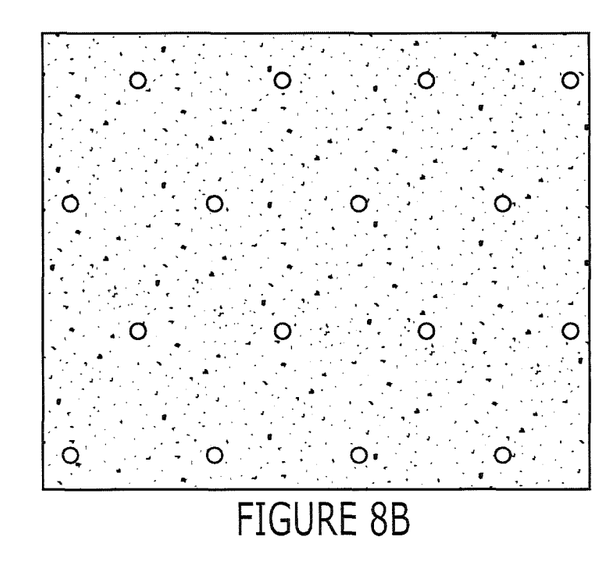
FIG. 8B is the hexagonal lattice pattern defined by the larger lattice constant in FIG. 8A.

Step 2: Formation of an array of indents or pits (See FIG. 3): Two different methods can be used for this purpose.
A) Referring to FIG. 4, a silicon nitride imprint stamp (size can vary according to the actual need) with the hexagonal pattern defined in FIG. 8B will first be formed. To do so, a silicon wafer (100) is patterned with the hexagonal pattern using deep-UV lithography ($\lambda$=248 nm). The wafer is dipped in KOH for anisotropic etching to create a mold with hexagonal arrays of inverted pyramids. Silicon nitride, $Si_3N_4$, is deposited onto the mold using chemical vapor deposition (CVD), followed by bonding another silicon wafer (as a support) on top. The silicon mold is removed by spin etching and grinding to release the imprint stamp having hexagonal arrays of pyramid indenters (206 nm in height and 300 nm apart). The stamp is then pressed onto the top surface of the Al layer prepared in step 1 to transfer indents.
B) A photo mask with the same pattern defined in FIG. 8B is first formed. This mask is used to create a photoresist layer covering the surface of the Al layer with exposed holes arranged in hexagonal pattern using a universal photolithographic technique (1818 positive photoresist, MF 319 developer). Then, an electrochemical stripping step in 9:1 ethonal:water solution is applied to the masked Al layer to form hexagonal arrays of pits in the Al layer. The photoresist is then removed using 1165 remover.

Step 3: Electropolishing: The Al layer is electropolished in a 9:1 ethonal to water solution to remove any oxide layer prior to anodization.

Step 4: Anodization (See FIG. 5): Anodization in 1.7 wt % phosphoric acid at 2° C. or in 0.3 M oxalic acid at 5° C. at 120V is performed until it reaches the gold layer through the monitoring of the anodization current. Note that according to Formulae I and II, given above, at 120V, a hexagonal pattern of pores with pore diameter of 160 nm and interpore distance of 300 nm will be formed. This means that although the pits are 1.2 µm apart, a finer hexagonal lattice (300 nm) will be spontaneously formed under this potential.

Step 5: Pore diameter resizing (See FIG. 6A): The diameter of the pores is resized from about 160 nm to about 250 nm by dipping the specimen in 5 wt % phosphoric acid at 30° C. for a controlled amount of time according to the desired pore diameter specification.

Step 6: Surface masking (See FIG. 6B): Prior to electrodeposition, the top surface of the porous alumina is masked again with photoresist using the same procedure described in Step 2B. As an alternative, a soft PDMS stamp can be made to stamp a polymeric cover layer onto the porous alumina.

Step 7: Electrodeposition (See FIG. 7A): Aluminum nanopillars are formed through electrodeposition into the open pores in an electrolyte solution containing either 1-ethyl-3-methyl-imidazolium bis(trifluoromethylsulfonyl)amide or 1-butyl-1-methyl-pyrrolidinium bis(trifluoromethylsulfonyl)amide at 25° C. at a constant potential of 0.93 V vs. Al/Al(III).

Step 8: Alumina removal (See FIG. 7B): To release the final structure of standing Al nanopillars with a pillar diameter of 250 nm and interpillar distance of 1.2 µm, the alumina template is dissolved by placing the specimen in 2.0M NaOH solution for about 20 minutes.

Example 2

Figure 9:
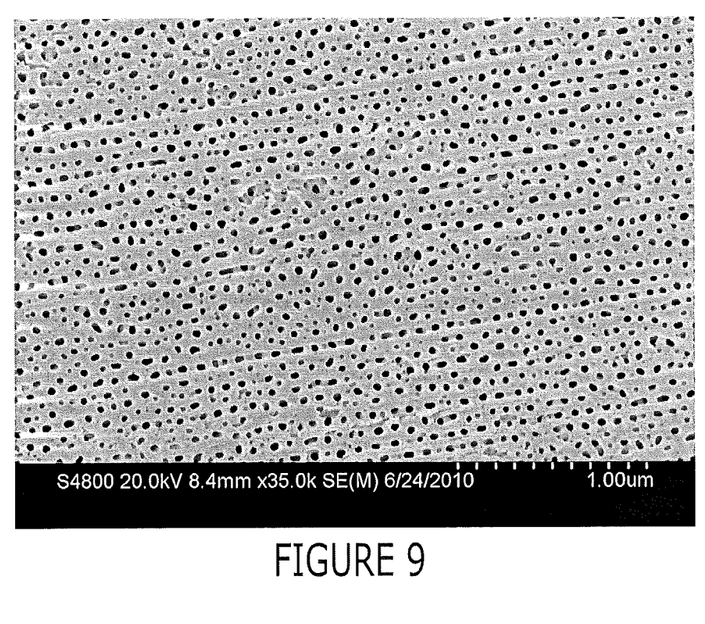
FIG. 9 is a hexagonal array of nanopores formed after using an imprinting stamp to position the pores at predefined locations.
Figure 10:
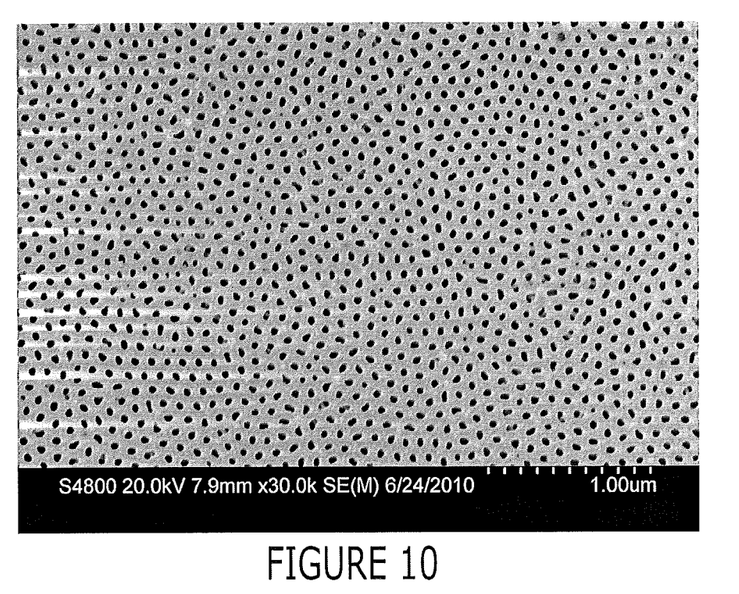
FIG. 10 is a comparative example to illustrate pore formation in the absence of the predefined imprints in the aluminum.

FIG. 9 is a SEM image of a nanopore array formed in an aluminum substrate after an imprinting stamp was used to form a hexagonal array of pits at predefined locations. The stamp is made of silicon (Lightsymth Tech, Eugene, Oreg.) consisting of parallel groves of 139 nm in width and 270 nm in periodicity. In this case, the formed nanopores are arranged in an altered hexagonal pattern, with the major pores aligning on the imprinted lines and the spontaneous pores in between. FIG. 10 shows a hexagonal array formed without the use of the imprinting stamp. In this case, the formed nanopores are arranged in a spontaneous hexagonal pattern.

The invention claimed is:

1. A method of forming a hexagonal nanopillar array, the method comprising:
   forming a base comprising aluminum, wherein forming the base comprises forming a layer of titanium on a substrate, forming a layer of gold on the titanium layer, and forming a layer of aluminum on the gold layer;
   forming a hexagonal pattern of pits in the aluminum;
   anodizing the aluminum to form aluminum oxide comprising a primary hexagonal nanopore array at positions of the pits in the aluminum;
   depositing a conductive material into the nanopores of the primary hexagonal nanopore array; and
   removing the aluminum oxide to provide the hexagonal nanopillar array.

2. The method of claim 1, wherein the hexagonal pattern of pits has a lattice constant in a range of about 300 nm to about 100 µm.

3. The method of claim 1, wherein each of the pits in the aluminum has a width in a range of about 10 nm to about 600 nm.

4. The method of claim 1, wherein the titanium layer has a thickness in a range of about 1 nm to about 100 nm.

5. The method of claim 1, wherein the gold layer has a thickness in a range of about 1 nm to about 100 nm.

6. The method of claim 1, wherein the aluminum layer has a thickness in a range of about 1 nm to about 1 mm.

7. The method of claim 1, wherein forming a hexagonal pattern of pits in the aluminum comprises,
   pressing a stamp comprising a hexagonal pattern of projections into the aluminum, wherein the hexagonal pattern of projections forms the hexagonal pattern of pits when pressed into the aluminum.

8. The method of claim 7, wherein the projections comprise silicon nitride.

9. The method of claim 1, further comprising electropolishing the aluminum after forming the hexagonal pattern of pits and before anodizing the aluminum.

10. The method of claim 1, wherein the primary hexagonal nanopore array is a mono-domain array.

11. The method of claim 1, wherein the width of each of the nanopores of the primary hexagonal nanopore array is in a range of about 10 nm to about 400 nm.

12. The method of claim 1, wherein the lattice constant of the primary hexagonal nanopore array is in a range of about 300 nm to about 100 μm.

13. The method of claim 1, wherein the aluminum oxide formed by anodization further comprises a secondary hexagonal nanopore array more closely spaced than the primary nanopore array.

14. The method of claim 13, wherein during depositing of the conductive material, the nanopores of the secondary hexagonal nanopore array that are not part of the primary hexagonal nanopore array are masked.

15. The method of claim 1, wherein the conductive material comprises a metal.

16. The method of claim 15, wherein depositing the conductive material comprises electrodepositing the metal in the nanopores of the primary hexagonal nanopore array.

17. The method of claim 15, wherein the metal comprises at least one metal selected from the group consisting of aluminum, gold, silver, copper, titanium and tantalum.

18. The method of claim 1, wherein each of the nanopillars of the primary hexagonal nanopillar array has a height in a range of about 10 nm to about 1 mm.

19. The method of claim 1, wherein each of the nanopillars of the primary hexagonal nanopillar array has a width in a range of about 1 nm to about 450 nm.

20. The method of claim 1, wherein the interpillar distance of the primary hexagonal nanopillar array is in a range of about 20 nm to about 100 μm.

21. A method of forming a hexagonal nanopillar array, the method comprising:
   forming a base comprising aluminum;
   forming a hexagonal pattern of pits in the aluminum, wherein forming the hexagonal pattern of pits comprises applying a photoresist to a surface of the aluminum, creating a photoresist pattern defining exposed regions of the surface of the aluminum at positions of the hexagonal pattern of pits, treating the exposed regions of the surface of the aluminum through the photoresist pattern to create the hexagonal array of pits in the aluminum, and removing the photoresist;
   anodizing the aluminum to form aluminum oxide comprising a primary hexagonal nanopore array at positions of the pits in the aluminum;
   depositing a conductive material into the nanopores of the primary hexagonal nanopore array; and
   removing the aluminum oxide to provide the hexagonal nanopillar array.

22. A method of forming a hexagonal nanopillar array, the method comprising:
   forming a base comprising aluminum;
   forming a hexagonal pattern of pits in the aluminum;
   anodizing the aluminum to form aluminum oxide comprising a primary hexagonal nanopore array at positions of the pits in the aluminum;
   depositing a conductive material into the nanopores of the primary hexagonal nanopore array; and
   removing the aluminum oxide to provide the hexagonal nanopillar array, wherein the method further comprises resizing widths of the nanopores of the primary hexagonal array after anodization.

23. The method of claim 22, wherein resizing the widths of the nanopores is achieved by applying phosphoric acid to the nanopores.

24. The method of claim 22, wherein the width of each of the nanopores of the primary hexagonal nanopore array after resizing is in a range of about 10 nm to about 600 nm.

* * * * *